Nov. 2, 1926.
A. F. MASURY ET AL
1,605,362
CUSHION CONNECTION FOR VEHICLE CONSTRUCTION
Filed Sept. 30, 1922
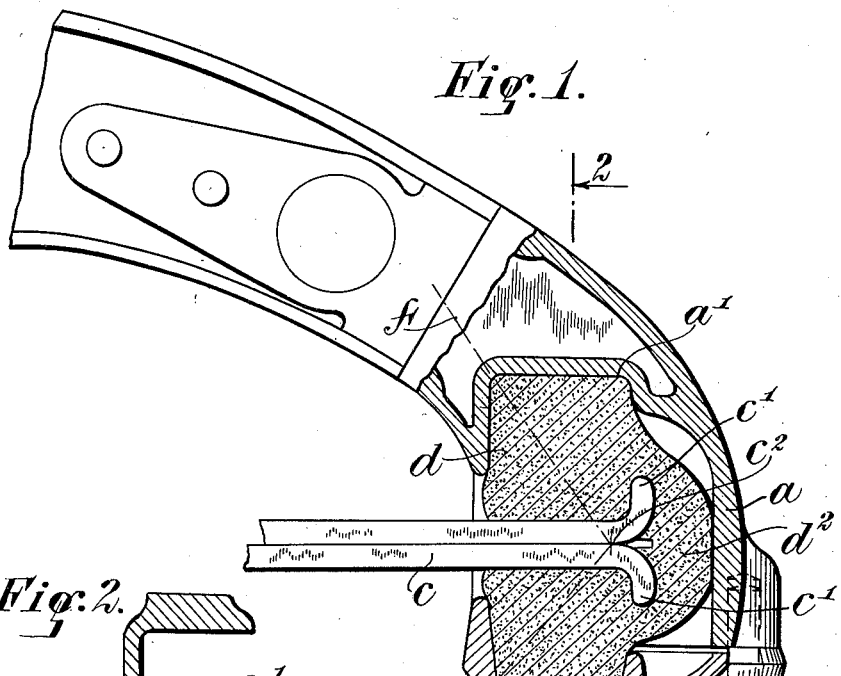
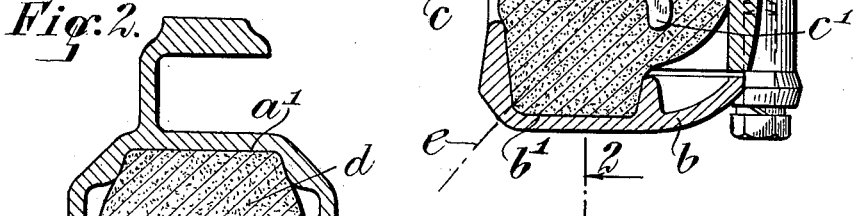
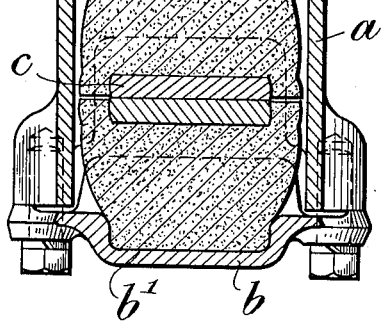
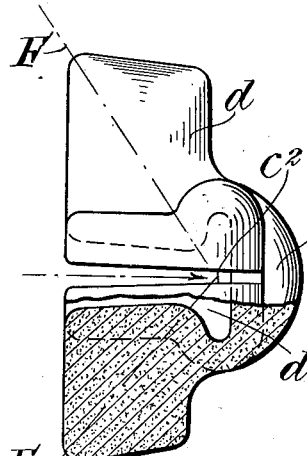
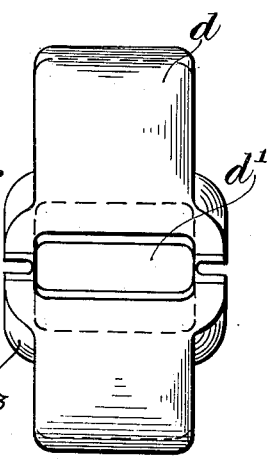
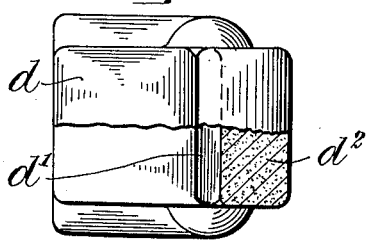

Patented Nov. 2, 1926.

1,605,362

UNITED STATES PATENT OFFICE.

ALFRED F. MASURY AND AUGUST H. LEIPERT, OF NEW YORK, N. Y., ASSIGNORS TO INTERNATIONAL MOTOR COMPANY, OF NEW YORK, N. Y., A CORPORATION OF DELAWARE.

CUSHION CONNECTION FOR VEHICLE CONSTRUCTION.

Application filed September 30, 1922. Serial No. 591,434.

In Letters Patent of the United States No. 1,404,876, dated January 31, 1922, there is shown and claimed broadly a non-metallic yielding connection between metallic parts of a motor vehicle. In the particular application the connection is shown as a rubber block interposed between the end of a vehicle spring and the frame and so engaged with each as to transmit driving stresses. The present invention is concerned with a cushion connection having the same general attributes and purposes but relates more specifically to certain features of construction which are believed to be of practical importance in use and particularly in certain situations. It is to be understood, however, that the present improvements may be incorporated wherever found to be advantageous although in the illustrated embodiment the application is with reference to the front end of the front spring of a motor vehicle. The principal object of the invention is to provide a connection for the purpose described which shall be of such construction as to cooperate most effectively with the end of the spring for the purpose of clinching the block more securely on to its seat and maintaining it in fixed relation to the center of oscillation of the spring in a manner which may be likened to the fixed center of turning of a spring about a shackle bolt. A further object of the invention is to so construct and mount the block and its housing as to set up stresses in the block which will be most effective in realizing fully the objects of the invention under particular conditions of use. Still another object of the invention is to provide a block which may be assembled most readily on the end of the spring and mounted in its housing by such means as will automatically prevent its displacement with respect to the spring end. It is to be understood that in practice the block is confined in its housing under compression although in accordance with the present improvements other compressive stresses are set up along pressure lines which will best serve the objects.

Reference is now to be had to the accompanying drawings for one practical embodiment of the invention in which:

Figure 1 is a view partly in elevation and partly in section through a front spring horn showing the relation of the front end of the front spring to the cushion connection and the relation of the cushion connection to its housing.

Figure 2 is a view in transverse section through the connection shown in Figure 1 and taken on the plane indicated by the line 2—2 of Figure 1 and looking in the direction of the arrows.

Figure 3 is a view in side elevation of the improved block part being broken away in the interest of clearness.

Figure 4 is a view in rear elevation of the block.

Figure 5 is a view in plan thereof part being broken away.

The housing for the block which may be of any approved form is shown as including an upper section $a$ having a seat $a'$ for the block and a detachable cap $b$ having a seat $b'$ for the bottom of the cap. The end of the spring $c$ is provided with a seat illustrated as upturned ends $c'$ of the spring leaves, to engage the block more securely. As shown most clearly in Figures 3 and 4 the block $d$ is molded with an opening $d'$ in its rear wall to receive the end of the spring $c$ and this opening in the improved construction extends through to the side walls so that the block when the upper and lower columns are pulled back to widen the opening $d'$ may be slipped on to the spring sidewise. The interior contour of the opening $d'$ is such as to accommodate the spring seat $c'$. The front wall of the block in line with the pressure line along the spring $c$ is molded with a substantial mass of material as indicated at $d^2$ which abuts against the front wall of the housing $a$ and cushions the stresses transmitted to the block along the pressure line of the spring. The principal problem sought to be met by the present improvements may be understood with reference to their application to the front springs of a motor vehicle. In this situation the front end of the front spring "drags", tending to withdraw from the housing when the vehicle is moving forward. The action set up is resisted by the block $d$ generally along the lines $e$, $f$. The present invention seeks to provide a construction which will most effectively resist this drag and, in addition, provide for clinching the block most securely on to the spring, the clinching action being substantially in proportion to the dragging stress. To this end, the top and bottom of the blocks as shown in Figure 3 are molded on an angle extending from the rear edge towards the front edge. When the block is assembled on flat seats $a'$, $b'$, and confined under compression the rear portion of the block will be placed under the greatest stress. The material of the block will be crowded towards the spring seat $c'$ generally along the pressure lines E, F. In this way, the inherent resiliency of the block is taken advantage of to set up pressure lines therein which will most effectively resist the dragging stresses transmitted to the block by the spring. Further, the pressure lines E, F, which are always present in the mass of the block serve to clinch it most securely on to the spring seat and when resolved into components of force tend to press the end of the spring towards the front end of the housing against the yielding resistance offered by the pad $d$. The whole effect is to insure a firm yielding engagement between all of the parts and maintain them yieldingly in the same relative position and hold them against displacement, one with respect to another. The pressure lines $e$, $f$, and E, F, intersect at a point $c^2$ which is substantially the center of turning of the spring $c$. By the construction heretofore described it is insured that this center of turning $c^2$ shall remain relatively fixed under all stresses so that the spring action will be similar to that insured in present day shackles by the shackle pin.

By slotting the block transversely from side wall to side wall assembly is facilitated in that the block may be flexed so as to spread its jaws and widen the opening $d'$ to permit the block to be slipped on to the spring seat sidewise before assembling it within the housing $a$. The opening $d'$ into which the spring extends may, of course, be of greater depth than the slots in the side walls so that the sides of the spring when the block is compressed will find lateral bearings as indicated most clearly in Figure 2, the slots at this time being practically closed. Figure 4 shows pads $d^3$ moulded at the lateral sides of the block but it is to be understood that the invention is not limited, in its broader aspects, to the size or form of the material by which lateral bearings are provided.

As indicated hereinbefore the improvements may be incorporated in constructions employed in other situations without departing from the spirit of the invention. It is also evident that a similar action might be secured and angular lines of pressure set up within the body of the block by forming the seats therefor on an angle while the top and bottom walls of the block are parallel, or by forming the upper and lower walls of the groove $d'$ angularly, as illustrated, or by forming the top and bottom sides of the spring $c$ angularly where they engage the block.

What we claim is:

1. In combination with the spring and frame of a motor vehicle, a wholly non-metallic connection and support interposed between an end of the spring and the frame and including a block of non-metallic yielding material engaged with the end of the spring, a housing for the block secured to the frame and confining the block and means to set up diagonal lines of increased density within the body of the block.

2. A wholly non-metallic connection and support interposed between two metallic parts of a motor vehicle, one of which parts is to be connected to and supported by the other of said parts, comprising a block of non-metallic yielding material, means on one of said parts to support and confine said block under compression at all times and hold it against displacement with respect thereto, the other of said parts being connected to the block independent of said means, and means carried with one of said parts to set up diagonal lines of increased density in the body of the block.

3. A wholly non-metallic mechanical connection and support interposed between the spring and frame of a motor vehicle and comprising a block of rubber engaged with the spring, and a housing secured to the frame and holding said block against displacement with respect thereto, said block being provided with means to set up diagonal lines of increased density in the body of the block to clinch it on the spring.

4. A wholly non-metallic connection and support interposed between two metallic parts of a motor vehicle one of which parts is to be connected to and supported by the other of said parts, comprising a block of non-metallic yielding material, a housing in which the block is confined under compression and means carried with one of the elements to set up diagonal lines of increased density within the body of the block.

5. In combination with the spring and frame of a motor vehicle, a wholly non-metallic mechanical connection and support interposed between an end of the spring and the frame and comprising a housing secured to the frame and a block of non-metallic yielding material engaged with the end of the spring and confined within said housing, the top and bottom walls of the block being angularly disposed with respect to the proximate walls of the housing.

6. In combination with the spring and frame of a motor vehicle, a wholly non-metallic mechanical connection and support interposed between an end of the spring and the frame and comprising a seat at the end of the spring, a block of non-metallic yielding material into which the spring end extends, a housing for the block secured to the frame and means to set up angular lines of pressure within the block to crowd it against the seat on the end of the spring.

7. A wholly non-metallic connection and support interposed between two metallic parts of a motor vehicle, one of which parts is to be connected to and supported by the other of said parts, comprising a block of non-metallic yielding material open at one side to receive one of said metallic parts and having a pad at the other side against which the end of said part presses, a housing to confine the block and on which said pad seats, and means to set up angular pressure lines within the body of the block to press the end of said last named metallic parts against said pad.

8. As an article of manufacture a block of non-metallic yielding material for the purpose described having its upper and lower faces angularly disposed with respect to each other.

9. As an article of manufacture a block of non-metallic yielding material formed with an opening in one side to receive the end of a spring and slotted in its side walls to permit the block to be slid on to the spring sidewise.

10. A wholly non-metallic connection and support interposed between two metallic parts of a motor vehicle, one of which parts is to be connected to and supported by the other of said parts, comprising a block of non-metallic yielding material open at the sides to receive one of said metallic parts and extended to form pads at the sides, and a housing to confine the block and on which said pads seat.

11. As an article of manufacture a block of non-metallic yielding material formed with an opening in one side to receive the end of a spring and slotted in its side walls to permit the block to be slid onto the spring sidewise and formed at its sides with pads in proximity to said slots to provide lateral bearings for the ends of the spring.

12. As an article of manufacture, a block of non-metallic yielding material formed with an opening in one of its lateral sides to receive the end of a spring and formed at said lateral sides with pads to provide lateral bearings for the spring.

13. In combination with the spring and frame of a motor vehicle, a wholly non-metallic mechanical connection and support interposed between an end of the spring and the frame and including a block, means to prevent displacement of the spring and frame with respect to the block, a housing for the block, and means to limit movement of the block in lateral directions.

14. A wholly non-metallic connection and support interposed between two metallic parts of a motor vehicle, one of which parts is to be connected to and supported by the other of said parts including a block of non-metallic yielding material formed at its sides with pads to provide lateral bearings and a housing within which the block is disposed and against the walls of which the pads are adapted to bear.

This specification signed this 27 day of Sept. A. D. 1922.

ALFRED F. MASURY.
AUGUST H. LEIPERT.